(12) United States Patent
Mürb

(10) Patent No.: US 9,950,446 B2
(45) Date of Patent: Apr. 24, 2018

(54) DEVICE FOR GRANULATING MELT MATERIAL

(71) Applicant: AUTOMATIK PLASTICS MACHINERY GMBH, Grossostheim (DE)

(72) Inventor: Reinhardt-Karsten Mürb, Aschaffenburg (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 453 days.

(21) Appl. No.: 14/570,105

(22) Filed: Dec. 15, 2014

(65) Prior Publication Data

US 2015/0099027 A1    Apr. 9, 2015

Related U.S. Application Data

(63) Continuation of application No. PCT/EP2013/001752, filed on Jun. 13, 2013.

(51) Int. Cl.
*B29B 9/06* (2006.01)
*B29B 9/16* (2006.01)

(52) U.S. Cl.
CPC .............. *B29B 9/06* (2013.01); *B29B 9/065* (2013.01); *B29K 2827/18* (2013.01)

(58) Field of Classification Search
CPC ......... B29C 33/56; B29C 33/60; B29C 33/62; B29B 9/02; B29B 9/06; B29B 9/16; B29B 9/165; B29B 13/045; B01J 2/00
USPC ................................................. 264/141, 142
See application file for complete search history.

(56) References Cited

U.S. PATENT DOCUMENTS

| | | | |
|---|---|---|---|
| 3,564,650 A | 12/1967 | Irving | |
| 3,673,298 A | 6/1972 | Miler | |
| 4,019,414 A * | 4/1977 | Thomas, Jr. | ............ B29B 9/065 83/356.3 |
| 5,042,169 A * | 8/1991 | Vero | ........................ B04C 5/20 34/591 |

(Continued)

FOREIGN PATENT DOCUMENTS

| | | |
|---|---|---|
| CN | 101119832 | 2/2008 |
| DE | 1813221 A1 | 10/1969 |

(Continued)

*Primary Examiner* — Atul P. Khare
(74) *Attorney, Agent, or Firm* — Buskop Law Group, P.C.; Wendy Buskop

(57) ABSTRACT

A device for producing pellets from a melt material. The device can have a perforated plate with nozzles from which a melt material emerges. Located opposite the perforated plate is a cutting chamber with a motor-driven cutter arrangement having a cutter head with at least one blade, and a cutter shaft. A coolant is introduced into the cutting chamber from an inlet apparatus. The inlet apparatus has a separate inlet chamber that circumferentially encloses the cutting chamber in the area of rotation of the at least one blade, and has an adjustable annular inlet nozzle arrangement. Coolant is introduced into the cutting chamber circumferentially and substantially radially inward from the outside. A substantially centripetal flow of the coolant is produced in the area of rotation, and the coolant and the pellets are conveyed to an outlet of the cutting chamber.

6 Claims, 1 Drawing Sheet

(56) References Cited

U.S. PATENT DOCUMENTS

| | | | | |
|---|---|---|---|---|
| 6,062,838 | A * | 5/2000 | Glawion | D01D 5/088 425/378.2 |
| 7,927,777 | B2 * | 4/2011 | Kinoshita | C08J 3/122 430/137.1 |
| 8,636,492 | B2 * | 1/2014 | Muerb | B29B 9/065 264/142 |
| 2004/0081716 | A1 | 4/2004 | Eloo | |
| 2010/0187707 | A1 | 1/2010 | Muerb | |
| 2010/0151072 | A1 * | 6/2010 | Scheurich | B23P 9/00 425/461 |
| 2013/0043616 | A1 * | 2/2013 | Deiss | B29B 9/065 264/142 |
| 2013/0287876 | A1 * | 10/2013 | Murb | B29B 9/06 425/67 |

FOREIGN PATENT DOCUMENTS

| | | | | |
|---|---|---|---|---|
| DE | 2035035 | A1 | 2/1972 | |
| DE | 2455757 | A1 * | 6/1976 | B29B 9/065 |
| DE | 102009006123 | | 7/2010 | |
| DE | 102009006123 | A1 | 7/2010 | |
| DE | 102009032993 | | 1/2011 | |
| DE | 102010015776 | A1 * | 10/2011 | B29B 9/065 |
| DE | 102011008257 | A1 * | 7/2012 | B29B 9/06 |
| EP | 0124505 | | 11/1984 | |
| EP | 0124505 | A1 | 11/1984 | |
| JP | 57004715 | A * | 1/1982 | B29B 9/065 |
| WO | 2010075597 | A1 | 7/2010 | |

\* cited by examiner

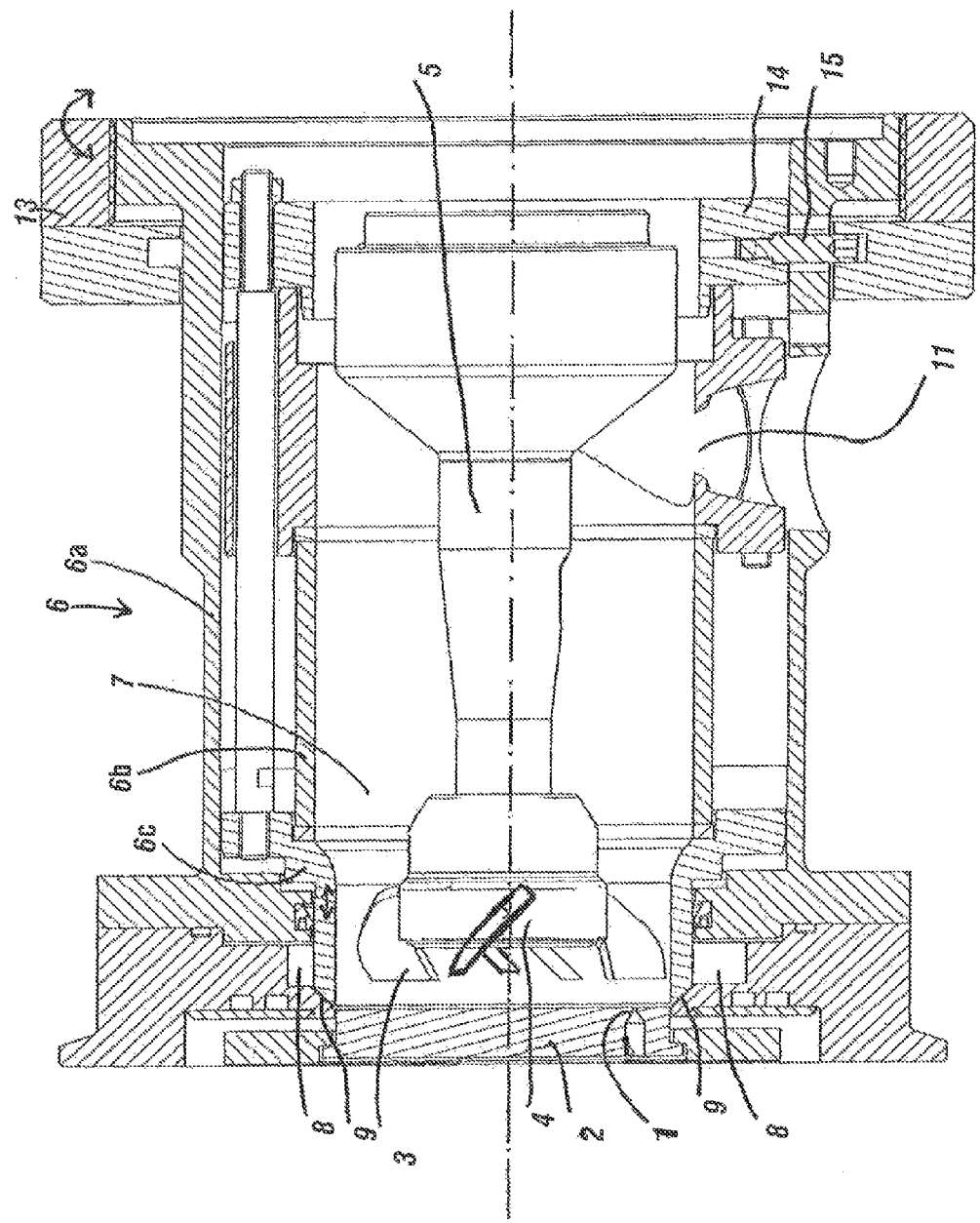

DEVICE FOR GRANULATING MELT MATERIAL

CROSS REFERENCE TO RELATED APPLICATIONS

The present patent application is a Continuation Application that claims priority to and the benefit of co-pending International Patent Application No. PCT/EP2013/001752, filed Jun. 13, 2013, entitled "DEVICE FOR GRANULATING MELT MATERIAL", which claims priority to DE Application No. 102012012061.3 filed Jun. 15, 2012, entitled "APPARATUS FOR GRANULATING MELT MATERIAL". These references are incorporated in their entirety herein.

FIELD

The present embodiments generally relate to a device for pelletizing melt material, such as a melt material comprising an active pharmaceutical ingredient or a polymer melt material. The device can produce pellets of the material for use in various processes, such as manufacturing pharmaceutical products.

BACKGROUND

Melt material in general today can be processed and treated through granulation. Extruders or melt pumps are frequently used in the granulation of melt material, such as for granulation of plastics. These extruders or melt pumps press molten plastic raw material through nozzles of a perforated plate into a coolant, such as water.

In this process, the material emerging through the openings of the nozzles is cut by a cutter arrangement with at least one rotating blade to produce pellets. Corresponding devices, which carry out methods for underwater granulation, for example, are known as underwater pelletizers, for example under the product name SPHERO™ from Automatik Plastics Machinery GmbH of Germany.

Systems for carrying out hot-cut pelletization in air as the coolant have been on the market for quite a long time, since they represent relatively easy-to-build machines for pelletizing extruded thermoplastics. In these machines, strands of melt emerging from a perforated plate are chopped by blades rotating as closely as possible to the surface, and are formed into pellets by the inertia inherent in the small pieces of strand material. As a result of the rotation of the blades, air is drawn in from the environment or the interior of the housing, and the air directs the pellets more or less freely and centripetally away from the cutting location.

Typical problems in these systems relate to poor cooling of the blades, which over the course of time can overheat and stick, as well as a tendency for general sticking and clogging of the systems, especially at high throughput rates with large quantities of pellets to be produced under real world conditions.

Furthermore, pellets produced in this way tend to have cylindrical and irregular shapes, especially when the viscosity of the melt material is relatively high. In the case of pharmaceutical materials in particular, a great many pellets of uniform size and shape are more likely to be required in the downstream applications. Furthermore, pharmaceutical applications often require spherical pellets.

When using the hot-cut pelletization method, a molten polymer matrix, is pressed through an arrangement of one or more nozzles terminating in a flat surface over which passes a cutter arrangement consisting of one or more blades. The emerging strand is cut by the blade or blades into small units, called pellets, each of which is initially still molten.

Subsequently the pellets are cooled to below the solidification temperature of the polymer matrix so that they solidify. As pellets solidify, they doing lose the inherent stickiness of the melt and the tendency to adhere to surfaces or other pellets.

In accordance with the prior art, a distinction is made here between methods that use a liquid coolant, known as underwater hot die-face pelletizing, and those that do not use a liquid coolant, known as air-cooled hot die-face pelletizing. Air-cooled hot die-face pelletizing can refer to the cooling of pellets without a liquid medium, or with a mist consisting of a mixture of a gas and droplets of a liquid.

The latter group is further differentiated by the type of additional cooling method that is downstream in terms of processing, such as water ring pelletizers, in which a water film flows over the wall of the cutting chamber, which has a more or less cylindrical to truncated conical shape, for pellets to drop into and for transportation out of the cutting device.

If contact with water is undesirable for products to be granulated, pelletizers are used in which the freshly cut, still molten pellets are cooled exclusively by the cooling and transport gas. It is nonetheless typical in pelletizing machines that the freshly cut pellets are accelerated radially outward by the centrifugal force of the cutter arrangement, and also that the cooling process proceeds relatively slowly. Therefore, pellets must travel a relatively long distance in free flight before being allowed to come into contact with a surface.

As a result, such pelletizers are very large, even for low throughputs. The large size and the relatively low coolant gas flow rate results in internal turbulent flow, causing pellets to come into contact with the housing parts and other machine parts before they are cooled, where they can stick.

Moreover, ambient air is typically drawn in as the coolant gas. Ambient air can be laden with dust and undesirable substances, and often it is difficult (if not impossible) to monitor the temperature, moisture content, and freedom from dust properties.

Therefore, in order to achieve operation of a pelletizer that is as trouble-free as possible, it would be desirable for the pellets to cool sufficiently rapidly that they already have a solidified surface before they come into contact with housing or cutter parts or with other pellets.

The cooling rate is primarily a function of the temperature gradient and secondarily a function of the rapid exchange of volume elements of the gas with one another, which is referred to in the technical field as the degree of turbulence. The Reynolds number can be used as the parameter for the degree of turbulence. In this context, the cooling effect depends primarily on the properties of the polymer melt (specifically temperature, thermal capacity, surface, thermal conductivity, particle size, and specific surface), and of the coolant gas itself (specifically temperature, thermal capacity, degree of turbulence, coolant gas/polymer pellet mass flow ratio).

Most of these factors are either material constants or parameters determined by the process technology, so only a few possibilities exist for influencing the intensity of the cooling effect. In the final analysis, the heat content of the polymer pellets must be transferred to the coolant gas. If heat exchange with the housing parts and other machine parts is disregarded, the heat content difference in the melt material is equal to the heat content difference in the coolant gas.

Simple adjustability of the volume flow rate of the cooling fluid to a cutting chamber of a pelletizing device would thus be desirable for feeding of both liquid and gaseous cooling fluid, for example water or process air.

The published German unexamined patent application DE 10 2009 006 123 A1 does indeed already describe a method and a device for pelletizing thermoplastic material exhibiting flow-optimized inlet nozzle arrangements for the cutting chamber of a pelletizer, but adjustability of a slot width of an annular nozzle arrangement is not described there.

The object of the present invention is to provide a device for pelletizing melt material that overcomes the disadvantages of the prior art and that allows effective pelletizing that is flexible in application, generating uniform pellet size as well as uniform and consistent shape, in a manner that is economical and structurally simple to build, while reducing the tendency of pellets to stick.

These and other objects of the present invention are attained by the present embodiments.

BRIEF DESCRIPTION OF THE DRAWINGS

The detailed description will be better understood in conjunction with the accompanying drawings as follows:

FIG. 1 shows a schematic, longitudinal cross-sectional view of a pelletizing device according to one embodiment of the invention.

The present embodiments are detailed below with reference to the listed FIGURE.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to a device for producing pellets from a melt material. The device can have a perforated plate with nozzles located therein from which the melt material emerges. A motor-driven cutter arrangement having a cutter head with at least one blade and a cutter shaft can be located opposite the perforated plate. The at least one blade of the cutter head passes over the nozzles in the perforated plate in a rotating manner and cuts pellets of the melt material emerging there.

The device can have a cutting chamber in a housing. The chamber can adjoin the perforated plate and enclose the at least one blade of the cutter arrangement. A coolant such as air or water can be introduced into the cutting chamber from an inlet apparatus so that in the process the pellets of the melt material are solidified in the coolant.

The inlet apparatus can have a separate inlet chamber that circumferentially encloses the cutting chamber in the area of rotation of the at least one blade, an inlet nozzle arrangement located circumferentially around the cutting chamber between the inlet chamber and the cutting chamber. Coolant can therefore be introduced there into the cutting chamber circumferentially from different sides in a substantially radially inward manner.

A substantially centripetal flow of the coolant is produced in the area of rotation, and subsequently the coolant and the pellets are conveyed to an outlet of the cutting chamber. According to the invention, in this design the inlet nozzle arrangement is implemented as an annular slot nozzle with an adjustable slot width, allowing for adjustment of coolant flow, and selection of pellet sizes through such adjustment.

With the present invention, it is possible to adjust the volume flow rate of the cooling and transport medium by adjusting the slot width of a slot nozzle. Persons having ordinary skill in the art will be able to select a flow rate such that the pellets are immediately separated after cutting, and can be accomplished at very high rates.

The slot nozzle, the inlet chamber, or both can be lined with a thermally insulating material or a nonstick material, such as a tetrafluoroethylene, a polytetrafluoroethylene, often referred to as Teflon®. The lining can also be a vitreous enamel. By using such an insulant, the coolant passing through there can be protected from unwanted heating. Nonstick linings can prevent clogging of the slot nozzle by deposits of melt material or other debris that can accumulate there.

The invention is explained in detail below by way of example with reference to the attached FIGURE and with reference to the cited examples.

Turning now to the FIGURE, FIG. 1 is a schematic, longitudinal cross-sectional view of a pelletizing device according to one embodiment of the invention.

FIG. 1 schematically shows a longitudinal cross-sectional view of a device for pelletizing melt material, such as a pharmaceutical melt material.

The pelletizing device shown schematically in FIG. 1 has a perforated plate 2 with a plurality of nozzles 1 provided therein. The arrangement of the nozzles 1 can be substantially rotationally symmetric and the remaining design of the device can also be substantially rotationally symmetric.

A cutter arrangement with at least one blade 3 can be place adjacent the perforated plate 2. The cutter arrangement can have a blade carrier 4, located on a blade shaft 5. The cutter arrangement is driven by a motor (not shown in FIG. 1), so that the at least one blade 3 passes over the nozzles 1 in the perforated plate 2 and in so doing cuts pellets melt material emerging from the nozzles 2.

The melt material can be melted in a conventional manner and can be transported, for example by an extruder or a melt pump (not shown in FIG. 1), to the area of the perforated plate 2 and be forced out of the nozzles 1 there. The device can have a cutting chamber 7 adjoining the perforated plate 2 in a housing 6 with an outer housing region 61 and an inner housing region 62.

During operation, the cutting chamber 7 can be filled with a coolant, such as air or water that also flows therethrough. The cutting chamber 7 can enclose the at least one blade 3 and the blade carrier as well as at least a portion of the blade shaft 5. The blade shaft 5 can be passed out of the housing 6 in the part of the housing facing away from the perforated plate 2 in a fluid-tight manner, and a motor (not shown in FIG. 1) can rotationally drive the at least one blade 3 via the cutter shaft 5.

The inlet apparatus can be provided having a separate inlet chamber 8 that circumferentially encloses the cutting chamber 7 in the area of rotation of the at least one blade 3, and having an inlet nozzle arrangement 9 placed to extend circumferentially between the inlet chamber 8 and the cutting chamber 7.

The inlet nozzle arrangement 9 in the embodiment shown in FIG. 1 is a circumferentially extending annular gap nozzle with an adjustable nozzle width that is constant over the circumference. In the embodiment shown, the inlet chamber 8 has a cross-section that decreases over its circumference, i.e., circumferentially, in the direction of rotation of the at least one blade 3, starting from an inlet opening 10 for the coolant in the inlet chamber 8.

In this embodiment, a circumferentially uniform flow rate of coolant flows through the inlet nozzle arrangement 9. The inlet nozzle arrangement 9 there can be implemented as a throttling device by adjusting the nozzle width, through which the coolant adiabatically expands and cools.

Due to the annular design of the inlet nozzle arrangement 9 between the inlet chamber 8 and the cutting chamber 7, the coolant is introduced into the cutting chamber 7 circumferentially from all sides substantially radially inward from the outside. In this process, a substantially centripetal flow of the coolant is produced in the area of rotation of the at least one blade 3.

The inlet nozzle arrangement 9 in this embodiment is designed as an annular slot nozzle with adjustable slot width such that in the circumferential direction it is always possible for the coolant to flow from all regions of the circumferential inlet chamber 8.

The adjustability of the slot width of the inlet nozzle arrangement 9 can result from a possible displacement of the wall element 6c that encloses the cutting chamber 7 at least in the area of rotation of the at least one blade 3.

The wall element 6c can have a first nozzle surface facing away from the perforated plate 2, and can be displaced in the axial direction of the arrangement as a whole (double-headed arrow in FIG. 1) relative to the outer housing part 6a, and thus also relative to the nozzle surface of the inlet nozzle arrangement 9 present on the side of the perforated plate 2. This axial movement can be accomplished by means of the inner housing parts 6b connected thereto, an inner ring 14, as well as a rotatable Vernier screw 13 in this embodiment (double-headed arrow in FIG. 1).

Other adjustment means can be substituted. For example, instead of the arrangement shown with the Vernier screw 13, axial adjustment of the slot width of the inlet nozzle arrangement 9 can also be implemented through a gate guide in the housing 6 (not shown in FIG. 1).

By means of the adjustable slot width, the geometry of the inlet nozzle arrangement can be selected such that the inlet nozzle arrangement can serve as a throttling arrangement for the cooling fluid entering the cutting chamber 7 through it. The coolant adiabatically expands, and thus cools, while passing therethrough when the slot width is suitable.

An outlet 11 can be located in the region of the cutting chamber 7 facing away from the inlet apparatus. After the rotation region, the coolant with the pellets located therein flows onward into the region of the outlet 11 of the cutting chamber 7, where they are directed against a wall of the cutting chamber 7 at a desired angle, such as 10 degrees or less, so that a rolling motion is imposed on the pellets of melt material located in the coolant there.

The device shown in FIG. 1 can be used for manufacturing pharmaceutical products or pellets from a suitable melt material.

While these embodiments have been described with emphasis on the embodiments, it should be understood that within the scope of the appended claims, the embodiments might be practiced other than as specifically described herein.

What is claimed is:

1. A device for producing pellets from a melt material, the device comprising:
   a. a perforated plate with a plurality of nozzles from which a melt material emerges;
   b. a motor-driven cutter arrangement with a cutter head located opposite the perforated plate, wherein the cutter head comprises at least one blade and a cutter shaft and is adapted for the at least one blade of the cutter head to pass over the plurality of nozzles in a rotating manner, thereby cutting the melt material into pellets;
   c. a cutting chamber located within a housing comprising an outer housing part spaced from an inner housing part, the inner housing part circumferentially defining the cutting chamber and the inner and outer housing parts running parallel to one another in a direction extending longitudinally down the length of the cutting chamber wherein the cutting chamber adjoins the perforated plate and encloses the at least one blade of the cutter head; and
   d. an inlet apparatus in fluid communication with the cutting chamber for introducing a coolant into the cutting chamber, wherein the inlet apparatus comprises:
      (i) an inlet chamber that circumferentially encloses the cutting chamber in an area of a rotation of the at least one blade; and
      (ii) an inlet nozzle arrangement in fluid communication with each of the inlet chamber and the cutting chamber, wherein the inlet nozzle arrangement introduces the coolant to the cutting chamber circumferentially and substantially radially inward, and further wherein the inlet nozzle arrangement is an annular slot nozzle with an adjustable slot width,
      wherein the adjustable slot width is adjustable by means of displacement of a wall element that encloses the cutting chamber in the area of rotation of the at least one blade, the wall element being connected to the inner housing part and having a first nozzle surface facing away from the perforated plate, and
      wherein the wall element is configured to be displaced in an axial direction of the nozzle arrangement corresponding to the longitudinal direction of the cutting chamber relative to the outer housing part and relative to a nozzle surface of the inlet nozzle arrangement present on a side of the perforated plate, the axial displacement of the wall element being accomplished by means of each of the inner housing part, an inner ring downstream longitudinally from the inner housing part, and a rotatable Vernier screw arranged circumferentially outward from the inner ring,
      wherein a substantially centripetal flow of the coolant is produced in the area of rotation of the at least one blade, thereby conveying the coolant and pellets formed from the melt material to an outlet of the cutting chamber.

2. The device for producing pellets of claim 1, wherein the annular slot nozzle is lined with a thermally insulating material or a nonstick material.

3. The device for producing pellets of claim 2, wherein the thermally insulating material or the nonstick material comprises:

a. a tetrafluoroethylene;
b. a polytetrafluoroethylene; or
c. a vitreous enamel.

4. The device for producing pellets of claim 1, wherein the inlet chamber is lined with a thermally insulating material or a nonstick material.

5. The device for producing pellets of claim 4, wherein the thermally insulating material or the nonstick material comprises:
a. a tetrafluoroethylene;
b. a polytetrafluoroethylene; or
c. a vitreous enamel.

6. The device for producing pellets of claim 1, wherein the inlet nozzle arrangement and the at least one blade are configured to direct the pellets against a wall of the cutting chamber at a desired angle.

* * * * *